United States Patent [19]

Sawai et al.

[11] Patent Number: 4,967,128
[45] Date of Patent: Oct. 30, 1990

[54] SERVO MOTOR CONTROL DEVICE

[75] Inventors: Kenji Sawai, Kyoto; Jinichi Itoh, Nagano, both of Japan

[73] Assignees: Omron Tateisi Electronics Co., Kyoto; Kabushiki Kaisha Sankyo Seiki Seisakusho, Nagano, both of Japan

[21] Appl. No.: 430,031

[22] Filed: Nov. 1, 1989

[30] Foreign Application Priority Data

Nov. 4, 1988 [JP] Japan ................................ 63-279099

[51] Int. Cl.$^5$ .......................................... G05B 11/36
[52] U.S. Cl. .................................... 318/609; 318/610; 318/721; 318/803; 318/811; 187/119; 187/115; 226/25
[58] Field of Search ............... 318/609, 610, 721, 803, 318/811; 187/119, 115; 226/25

[56] References Cited

U.S. PATENT DOCUMENTS

| 4,027,745 | 6/1977 | Watanabe | 187/115 |
| 4,307,591 | 12/1981 | Peterson | 226/25 X |
| 4,573,002 | 2/1986 | Kurakake | 318/721 |
| 4,611,159 | 9/1986 | Kurakake et al. | 318/811 |
| 4,914,365 | 4/1990 | Murakami et al. | 318/609 |

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A servo motor control device as provided in which the torque indication signal is not effected by the speed of rotation of the motor. This is accomplished by providing a torque corrector for converting an output of a speed detector into a torque correction signal. A subtractor is used for outputting the difference between a current instruction signal and the torque correction signal. The output of the subtractor is used as the torque indication signal.

4 Claims, 3 Drawing Sheets

SERVO MOTOR CONTROL DEVICE

BACKGROUND OF THE INVENTION

1. Field of the Industrial Application

The present invention relates to a servo motor control device.

2. Description of the Prior Art

FIG. 3 shows one example of a conventional servo motor control device.

In the example, in order to rotate a motor 1 at a speed $\omega$ [rad/sec], a target value $\omega$ for the speed $\omega^*$ is determined, and a speed instruction signal $V_1$ [V] is applied in compliance with the target value $\omega^*$. Accordingly, the speed instruction signal $V_1$ is correlated with the speed $\omega$ of the motor 1. The speed instruction signal has a trapezoid waveform as shown in FIG. 4. In the case where the motor 1 is used to drive an arm of an industrial robot, the above-described trapezoid waveform speed instruction signal $V_1$ is repeatedly inputted in order to reciprocate the arm of the robot. In the operation of the motor 1, the speed $\omega$ [rad/sec] thereof is applied to a speed detector 2, where it is subjected to F-V (frequency-to-velocity) conversion. That is, it is converted into $\omega K_{TG}$, which is fed back to a subtractor 3 where it is subtracted from the speed instruction signal $V_1$ (where $K_{TG}$ has the dimension [V/rad/sec], and $\omega K_{TG}$ has the dimension [V]).

The output $(V_1 - \omega K_{TG})$ of the subtractor 3 is applied to a PI (proportional integral) compensator 4 having the following transfer characteristic:

$$Kv(1 + 1/(S\, Tv))$$

The transfer function $G(s)$ of the PI compensator 4 is as follows:

$$\begin{aligned}G(s) &= Kv(1 + 1/(STv)) = Kv(1 + STv)/(STv) \\ &= Kv \times (1 + STv) \times (1/(STv))\end{aligned}$$

where $S = j\omega$, and therefore $$G(j\omega) = Kv(1 + j\omega Tv)/(j\omega Tv)$$

The gain characteristic (g) is:

$$\begin{aligned}g &= Kv\, 20\log|1 + j\omega Tv| \times (1/(j\omega Tv)) \\ &= Kv\, 20\log_{10}|1 + j\omega Tv| + 20\log_{10}|1/(j\omega Tv)|\end{aligned} \quad (1)$$

The function of equation (1) is as shown in FIG. 5. That is, the PI compensator 4 offers large gain with respect to the low frequency component of the difference output of the subtractor 3, and offers constant gain with respect to the high frequency component higher than Tv of the output of the subtractor 3.

The output of the PI compensator 4 is a current instruction signal (the dimension of V) which is applied as a positive input to the point A. In addition, the output of the PI compensator 4 is provided as a torque indication voltage. The current I [A] flowing in the motor 1 is applied to a current detector 5, where it is converted into a voltage which is applied as a negative input I $K_{If}$ to the point A. The input $K_{If}$ is measured in [V/A], and the input I $K_{If}$ is measured in [V]. At the point A, the output of the current detector 5 is subtracted from the output of the PI compensator 4, and the resultant difference is applied to a current amplifier 6, which is multiplied by a factor $K_I$. $K_I$ has no dimension. The current amplifier 6 supplies to the motor 1 a drive voltage (the output of a drive transistor) for actually driving the motor 1. Upon application of the output of the current amplifier 6 to the motor 1, current flows in the resistance R of the motor 1. A voltage ($j\omega L \times I$) attributed to the inductance L of the motor 1 is applied, as a negative input, to the point B, where it is subtracted from the output of the current amplifier 6. The voltage drop V of the motor is as follows: $V = R\,I + S\,L\,I$. Therefore, $R\,I = V - S\,L\,I$. A larger part of the high frequency component of the voltage V is absorbed by the inductance L, and R I, as shown in FIG. 6, and does not contain many high frequency components. Also, $S\,L\,I = j\omega L\,I$. Therefore, when the frequency f of $\omega$ increases, $j\omega L\,I$ is increased, whereas R I is decreased.

The dimension of the torque constant $K_T$ of the motor 1 is [Kg·m²·sec⁻²/A], I $K_T$ has the dimension [Kg·m²·sec⁻²], and torque T has the dimension of [Kg·m²·sec⁻²]. The transfer function due to inertia J of the motor 1 is 1/(S J), and $T \times (1/SJ) = \omega$ [rad/sec] is the speed of rotation $\omega$ of the motor 1, where S represents d/dt which has the dimension of [sec⁻¹], and J is represented by the dimension of [Kg·m²]. Therefore, the following is established:

$$\begin{aligned}T \times 1/(SJ) &= [\text{Kg} \cdot \text{m}^2 \cdot \text{sec}^{-2}] \times 1/[\text{sec}^{-1}][\text{Kg} \cdot \text{m}^2] \\ &= [\text{sec}^{-1}] = 1/\text{sec}\end{aligned}$$

That is, $1/V \int T(t)\,dt = \omega(t)$ Since [rad] has no dimension, $T \cdot (1/(S\,J))$ may be represented by [rad/sec].

When the motor 1 rotates at a speed of $\omega$, a counter electromotive force is induced therein, and therefore the counter electromotive voltage $\omega K_E$[V] which is the product of the counter electromotive force constant $K_E$[V/rad/sec] and the speed of $\omega$ is applied, as an input, to the point B, where it is subtracted from the output of the current amplifier 6. Hence, as the speed of rotation $\omega$ of the motor 1 increases, the counter electromotive force is increased. Further, the current flowing in the motor is inversely proportional to the counter electromotive force.

The output of the PI compensator 4 is provided, as the torque indication signal, at an output terminal (torque indication terminal). The torque indication signal can be observed with an oscilloscope or the like. The torque of the motor 1 can be read through observation of the torque indication signal. Therefore, when a device (such as an arm of an industrial robot) moves abnormally which is driven by the motor 1, it can be directly detected whether or not the motor provides torque as required. This provides the result that it can be detected whether or not the motor 1 or the device operates correctly. Furthermore, since the torque of the motor in operation can be visually detected, the operating characteristics of the motor can be detected. In addition, the torque indication signal may be utilized for control of the operation of the motor as follows. When the torque of the motor is abnormal, or higher and lower than the predetermined value, a motor stop signal may be provided by applying the torque indication signal to a robot controller or the like.

In the above-described servo motor control device, the counter electromotive force $\omega K_E$ is applied at point B. This is equivalent to the application of $(1/K_I) \cdot \omega K_E$ at point A. That is, FIG. 3 can be rewritten into FIG. 7.

The actual torque of the motor 1 is proportional to the true instruction value I'' which is obtained by subtracting a value Ie', proportional to the counter electromotive force, from the output I' of the PI compensator 4 as shown in FIG. 8. However, the torque indication voltage I' at the torque indication terminal is the sum of I'' and $(1/K_I)\cdot\omega K_E$. The value $(1/K_I)\cdot\omega K_E$ increases with the speed of rotation $\omega$, and accordingly the torque indication voltage I' increases with the speed of rotation $\omega$, as shown in FIG. 9. Thus, the torque indication voltage I' corresponds to the torque of the motor 1 in the rate of 1:1. However, when the torque indication voltage I' is changed by the speed of rotation $\omega$, the former I' is shifted as shown in FIG. 9.

SUMMARY OF THE INVENTION

Accordingly, an object of this invention is to eliminate the above-described difficulties accompanying a conventional servo motor control device. More specifically, an object of the invention is to provide a servo motor control device in which the torque indication signal is not affected by the rotation speed of the motor.

The present invention achieves the above described objects by providing a servo motor control device comprising a speed detector for detecting the rotation speed of an electric motor and a PI compensator for receiving the difference between a speed instruction signal and the output of a speed detector, in order to output a current instruction signal. The device further utilizes a current detector for detecting current flowing in the motor and a current amplifier receiving the difference between the current instruction signal and the output of the current detector, and for receiving the difference between the current instruction signal and the counter electromotive voltage. The current is applied to the coil of the motor. In the present invention, a torque corrector is provided for converting an output of the speed detector into a torque correction signal and a subtractor is provided for outputting the difference between the current instruction signal and the torque correction signal, the output of the subtractor being employed as a torque indication signal. Therefore, the servomotor control device of the present invention can provide the correct torque indication signal which is not affected by the rotation speed of the motor. Accordingly, the torque required for operating an industrial robot which is driven by the motor can be detected with higher accuracy, and the operating characteristics of the robot can be improved.

DESCRIPTION OF THE PREFERRED EMBODIMENT

Figure 1:
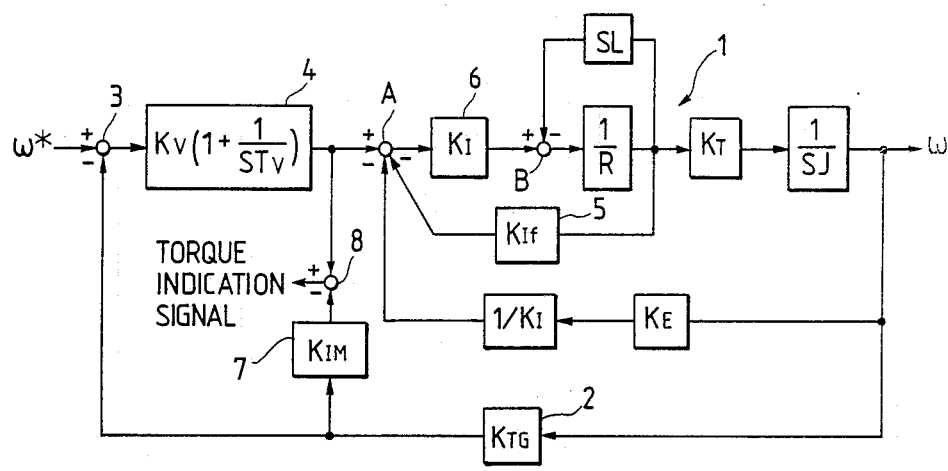
FIG. 1 is a block diagram showing one embodiment of the present invention.
Figure 3:
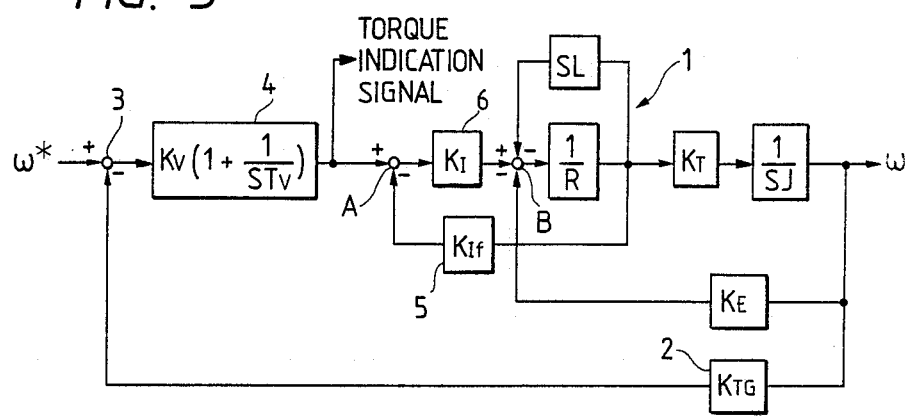
FIG. 3 is a block diagram showing one example of a conventional servo motor control device.
Figure 4:
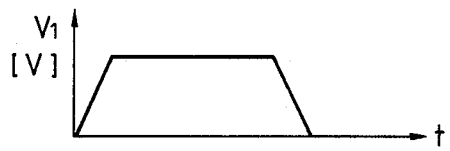
FIG. 4 is a waveform diagram showing one example of a speed instruction signal applied to the conventional servo motor control device.
Figure 5:
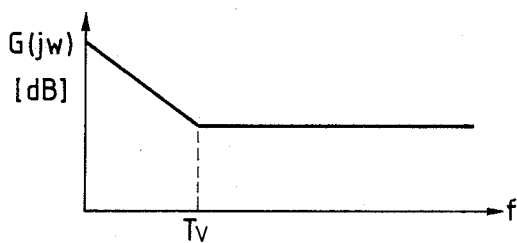
FIG. 5 is a characteristic diagram showing the transfer function of a PI compensator in the conventional servo motor control.
Figure 6:
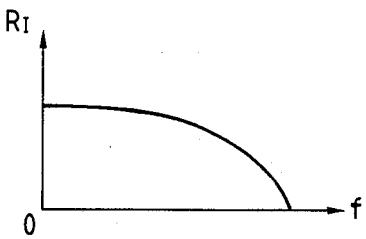
FIG. 6 is a characteristic diagram showing the frequency characteristic of the voltage developed by the resistance of the conventional servo motor control device.
Figure 7:
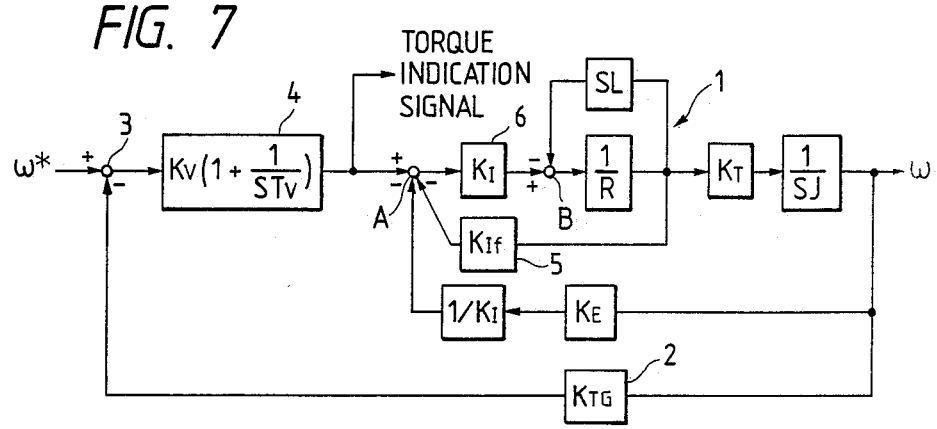
FIG. 7 is a block diagram showing an equivalent circuit to the conventional servo motor control device.
Figure 8:
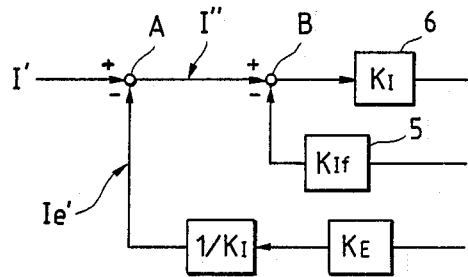
FIG. 8 is a block diagram showing a part of the equivalent circuit to the conventional servo motor control device.
Figure 9:
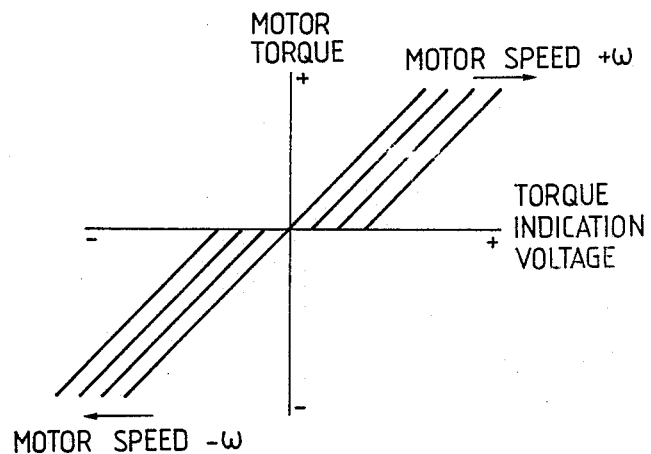
FIG. 9 is a characteristic diagram indicating relationships between the motor torque, motor speed and torque indication voltage of the conventional servo motor control device.

FIG. 1 shows one preferred embodiment of the present invention. In FIG. 1, those parts which have been previously described with reference to FIG. 3 are therefore designated by the same reference numerals or characters.

The embodiment is designed as follows. In the servo motor control device of the present invention, the output signal $\omega K_{TG}$ of the speed detector 2 is applied to a torque corrector 7, where it is multiplied by a correcting factor $K_{IM}$, to provide a torque correction signal proportional to the counter electromotive voltage. The torque correction signal is applied to a subtractor 8, where it is subtracted from the output (I') of the PI compensator 4. The result of subtraction is applied, as a torque indication voltage, to the torque indication terminal.

The current instruction value I', including the error Ie' as was described before, is different from the true instruction value I''.

$$I' = I'' + Ie'$$

$$Ie' = (1/K_I)\cdot K_E\cdot\omega$$

Therefore, in the embodiment, a true torque indication voltage is obtained by correcting I', and the amount of correction is equal to Ie'. That is, the correction should be made in the amount of the error Ie'. In the embodiment, the torque indication voltage is obtained by subtracting an amount of correction $K_{IM}\cdot K_{TG}\cdot\omega$ from I'. Hence the amount of correction Ie' is:

$$Ie' = K_{IM}\cdot K_{TG}\cdot\omega = (1/K_I)\cdot K_E\cdot\omega$$

$$K_{IM}\cdot K_{TG} = (1/K_I)\cdot K_E$$

$$K_{IM} = K_E/(K_I\cdot K_{TG}) \tag{2}$$

Figure 2:
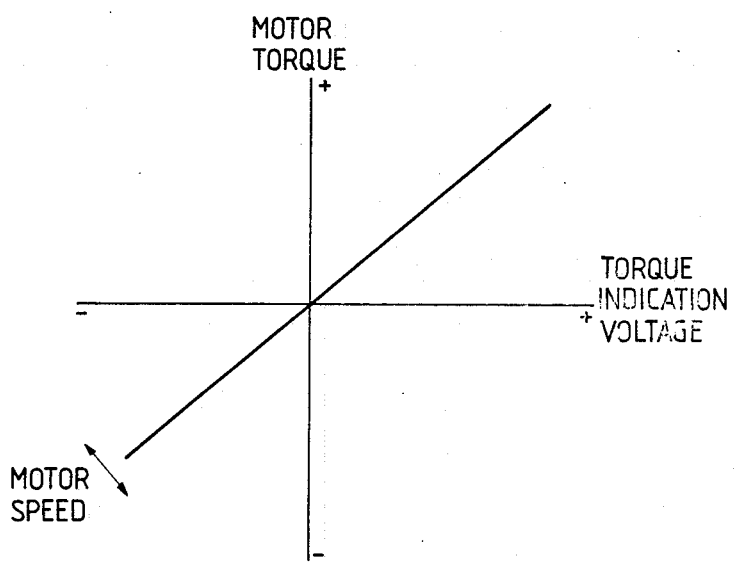
FIG. 2 is a characteristic diagram showing the motor torque vs. torque indication voltage characteristic of the embodiment.

Hence, by selecting the correcting factor $K_{IM}$ which meets equation (2), the amount of correction Ie' can correct the error Ie' of the torque indication voltage, as a result of which the torque indication voltage corresponds to the torque of the motor 1 in the rate of 1:1 as shown in FIG. 2. That is, the torque indication voltage representing the torque of the motor 1 can be correctly obtained.

In the above-described embodiment, the amount of correction Ie' may be determined so as to satisfy the following expression, to obtain a substantially correct torque indication voltage:

$$K_{IM} = K_E/(K_I + K_{TG})$$

While the above-described embodiment concerns a DC servo motor, the technical concept of the invention is equally applicable to an AC servo motor.

As was described above, the servo motor control device of the present invention comprises a speed detector for detecting the speed of rotation of an electric motor and a PI compensator for receiving the difference between a speed instruction signal and the output of the speed detector, to output a current instruction signal. The device further includes a current detector for detecting current flowing in the motor and a current amplifier for receiving the difference between the current instruction signal and the output of the current detector, and for receiving the difference between the current instruction signal and the counter electromotive voltage. Current is applied to the coil of the motor. In the present invention, the improvement comprises using a torque corrector for converting an output of the speed detector into a torque correction signal and a subtractor for outputting the difference between the current instruction signal and torque correction signal, the output of the subtractor being employed as a torque indication signal. Therefore, the servo motor control device of the present invention can provide the correct torque indication signal which is not affected by the rotation speed of the motor. Accordingly, the torque required for operating an industrial robot, which is driven by the motor, can be detected with high accuracy, and the operating characteristics of the robot can be improved. Furthermore, the servo motor control device of the present invention which detects the operating conditions of an industrial robot may be employed as a detector for a novel control operation of the robot.

What is claimed is:

1. In a servo motor control device for an electric motor of the type having
    a speed detector for detecting the speed of rotation of said electric motor;
    a proportional integral (PI) compensator for receiving a difference between a speed instruction signal and said detected speed in order to output a current instruction signal;
    a current detector for detecting current flowing in said motor; and
    a current amplifier for receiving an input comprising said current instruction signal minus an output of said current detector minus a counter electromotive voltage, to apply current to a coil of said motor, the improvement comprising:
    a torque corrector for converting said output of said speed detector into a torque correction signal; and
    a subtractor for outputting a difference between said current instruction signal and said torque correction signal,
    an output of said subtractor being employed as a torque indication signal.

2. A servo motor control device as claimed in claim 1, wherein said torque corrector multiplies said output of said speed detector by a correcting factor to obtain said torque correction signal.

3. A servo motor control device as claimed in claim 2, wherein said torque correction signal is proportional to said counter electromotive voltage.

4. A method of controlling an electric servo motor comprising the following steps:
    detecting the speed of rotation of said electric motor;
    receiving a difference between a speed instruction signal and said detected speed output;
    determining an output current instruction signal from said received difference;
    detecting a current flowing in said motor;
    receiving an input comprising said current instruction signal minus said detected current minus a counter electromotive voltage;
    applying current to a coil of said motor;
    converting said output of said speed detector into a torque correction signal; and
    outputting a difference between said current instruction signal and said torque correction signal for use as a torque indication signal.

* * * * *